United States Patent [19]

Sabourin

[11] Patent Number: 6,108,627
[45] Date of Patent: Aug. 22, 2000

[54] AUTOMATIC TRANSCRIPTION TOOL

[75] Inventor: Michael Sabourin, Saint-Lambert, Canada

[73] Assignee: Nortel Networks Corporation, Canada

[21] Appl. No.: 08/962,455

[22] Filed: Oct. 31, 1997

[51] Int. Cl.[7] .................................................. G10L 15/06
[52] U.S. Cl. ........................... 704/243; 704/254; 704/10; 704/260
[58] Field of Search .............................. 704/10, 243, 260, 704/257, 255, 9

[56] References Cited

U.S. PATENT DOCUMENTS

| | | | |
|---|---|---|---|
| 4,653,100 | 3/1987 | Barnett et al. | 704/268 |
| 4,831,654 | 5/1989 | Dick | 704/260 |
| 5,040,218 | 8/1991 | Vitale et al. | 704/260 |
| 5,329,608 | 7/1994 | Bocchieri et al. | 704/243 |
| 5,384,893 | 1/1995 | Hutchins | 704/260 |
| 5,774,854 | 6/1998 | Sharman | 704/260 |

OTHER PUBLICATIONS

Sullivan, et al., "Novel–Word Pronounciation: A Cross–Language Study," Speech Communication 13, (1993), pp. 441–452.

Luk, et al., "Stochastic Phonographic Transduction for English*," Computer Speech and Language, 10, pp. 133–153, Apr. 1996.

Golding, et al., "A Comparison of Anapron With Seven Other Name–Pronounciation Systems," Journal of the American Voire I/o Society, vol. 14, p1–21, 1993.

Cummings, "American English Spelling—An Informal Description, " The Johns Hopkins University Press, 1988, pp. 90–141.

Kahn, "Syllable–Based Generalizations in English Phonology," Massachusetts Institute of Technology, Sep. 1976, pp. 17–32, 41–48, 56–61, 80–81, 106–107, 136–137.

*Primary Examiner*—David R. Hudspeth
*Assistant Examiner*—Donald L. Storm
*Attorney, Agent, or Firm*—Finnegan, Henderson, Farabow, Garrett & Dunner, L.L.P.

[57] ABSTRACT

An automatic transcription tool executing on a computer system includes a text pre-processor, a phrasal parser, a word transcriber, and a phrasal transcription post-processor. Word orthographies are input to the text pre-processor and are then sequentially processed by the phrasal parser, word transcriber, and phrasal transcription post-processor.

In general, the text pre-processor performs initial substitution processing on the input orthography sequences, the phrasal parser groups related adjacent input orthographies into clauses, the word transcriber performs phonetic transcription, and the phrasal transcription post-processor performs functions, such as, liasion handling and sanity checking on the output phonetic transcriptions. The phonemic transcription of the input orthography is eventually output.

23 Claims, 12 Drawing Sheets

# AUTOMATIC TRANSCRIPTION TOOL

BACKGROUND OF THE INVENTION

The present invention relates generally to speech processing, and specifically, to methods and systems for transcribing orthographies into corresponding phonemic transcriptions.

Phonemes are the units of sound in a language that distinguish one word from another. The word "cat," for instance, contains three phonemes. Unfortunately, there is often no direct correspondence between the normal spelling of a word, called the word's orthography, and the spoken sounds we actually produce. One sound can be represented by a number of different letters or combinations of letters. For example, the first sound in the words "cat," "kick," "quick," and "chemistry" is the same. On the other hand, the initial letter "c" in "cat" and "circus" represent different sounds.

Because of the problems posed by English spelling, and spelling in other languages, phonemic alphabets have been used to represent words in which each symbol in the phonemic alphabet corresponds to one sound. So, for example, the initial sound in "cat" and "kick" may be represented by the symbols /k/, while the one in "circus" may be represented by the symbol /s/. Throughout this disclosure, a phonemic alphabet of 40 symbols is used, although other phonemic alphabets could equivalently be used. Further, backslashes will be used, when necessary, to distinguish a symbol as a phonemic one.

A "phonemic transcription" encodes the sound patterns of a word using the phonemic alphabet. In addition to symbols from the phonemic alphabet, phonemic transcriptions may additionally include information relating to word stress and syllabification. For example, the orthography "communications" is phonemically transcribed as /k*-mju=n*-ke=S*nz/ [0-2-0- 1-0], where the symbols {k,*, m, j,u,e,S,n,z} are phonemes, {-, =} are syllable markers, and {0,1,2} are stress indicators (1=primary stress, 2=secondary stress, 0=unstressed).

Phonemic transcription dictionaries are useful in a number of areas of speech processing, such as in speech recognition. These dictionaries typically contain a collection of orthographies, their corresponding phonemic transcriptions, and optionally, stress and syllabification information.

Conventional phonemic transcription dictionaries have been created manually using a human expert or automatically using a computer. Manual transcription of orthographies is laborious and produces inconsistencies among different transcribers. Conventional automatic transcription techniques, on the other hand, although faster and more consistent, still have a relatively high error rate and often do no better than a list of possible transcriptions that must then be refined by a human.

There is, therefore, a need to improve automatic transcription techniques.

SUMMARY OF THE INVENTION

An automatic transcription tool consistent with the present invention uses a variety of transcription methods to generate relatively accurate phonemic transcriptions.

Specifically, a first method consistent with this invention transforms orthographies of words into corresponding phonemic transcriptions. The method comprises the steps of: (1) receiving an orthography; (2) generating transcription hypotheses for the received orthography using a selected one of a sequence of handlers, the selected handler being the first in the sequence of handlers that is able to generate a transcription hypothesis, and next sequential ones of the handlers being executed when a previous sequential handler is unable to generate the transcription hypotheses; and (3) outputting the generated transcription hypotheses when said selected handlers successfully generates the transcription hypotheses.

Another method consistent with the present invention generates mapping values indicating a likelihood of a particular orthographic sequence, called a grapheme, mapping to a particular phoneme sequence. The method comprises the steps of: (1) aligning component graphemes of an orthography in a training dictionary to corresponding phonemes in the training dictionary; (2) concatenating graphemes and phonemes adjacent to one another in the orthography to create contextual strings of graphemes and phonemes; (3) counting the number of occurrences of grapheme contextual strings and phoneme contextual strings; and (4) calculating grapheme-to-phoneme mapping values based on results of the counting step.

Yet another method consistent with the present invention generates transcription hypotheses of an orthography. The method comprises the steps of: (1) receiving the orthography; (2) decomposing the received orthography into a plurality of potential combinations of substrings; (3) comparing the substrings for each potential combination to a mapping dictionary and marking the potential combination as valid if all of the substrings of the combination are present in the dictionary; (4) calculating a transcription score for the valid combinations by multiplying together values associated with each said substring of each said valid combination; and (5) selecting the highest transcription scores as the transcription hypotheses.

Still another method consistent with the present invention automatically partitions a transcription into syllables, the method comprises the steps, executed by a data processor, of: (1) labeling vowels and diphthongs in the transcription as nuclei; (2) locating consonant sequences between successive nuclei; (3) matching the consonant sequences to a pregenerated table of known syllabified sequences; and (4) assigning syllable markers to the consonant sequences based on syllabification information from the pregenerated table.

Still yet another method consistent with the present invention generates a table of known syllabified sequences from a training set of syllabified phonemic transcriptions. The method comprises the steps of: (1) receiving a first syllabified phonemic transcription from the training set; (2) labeling vowels and diphthongs in the first syllabified phonemic transcription as nuclei; (3) extracting consonant sequences between successive nuclei in the first syllabified phonemic transcription; (4) storing the extracted consonant sequences in the table; (5) appending adjacent vowels to the consonant sequences; and (6) storing the appended consonant sequences in the table.

Yet another method consistent with the present invention adds primary stress information to a syllabified phonemic transcription. The method comprises the steps of: (1) parsing the syllabified phonemic transcription into component syllables; (2) assigning values to the component syllables based on lookup tables generated through a prior analysis of a training set having known stress information; and (3) designating the syllable with the highest assigned value as having primary stress.

A final method consistent with the present invention generates transcription hypotheses of an orthography. The method comprises the steps of: (1) receiving the orthography; (2) identifying a root word and any corresponding suffixes and prefixes within the orthography; (3) transcribing the identified root word; and (4) extending the transcription of the root word using a rule base specifying transcriptions of the corresponding suffixes and prefixes.

BRIEF DESCRIPTION OF THE DRAWINGS

The accompanying drawings, which are incorporated in and constitute a part of this specification, illustrate several embodiments of the invention and, together with the description, serve to explain the principles of the invention. In the drawings.

DETAILED DESCRIPTION

Reference will now be made in detail to the embodiments of the invention, examples of which are illustrated in the accompanying drawings.

Generally, methods and systems consistent with the present invention implement a transcription tool that automatically transcribes word orthographies into phonemic transcriptions. The transcription tool is made up of four software components: a text pre-processor, a phrasal parser, a word transcriber, and a phrasal transcription post-processor.

System Description

Figure 1:
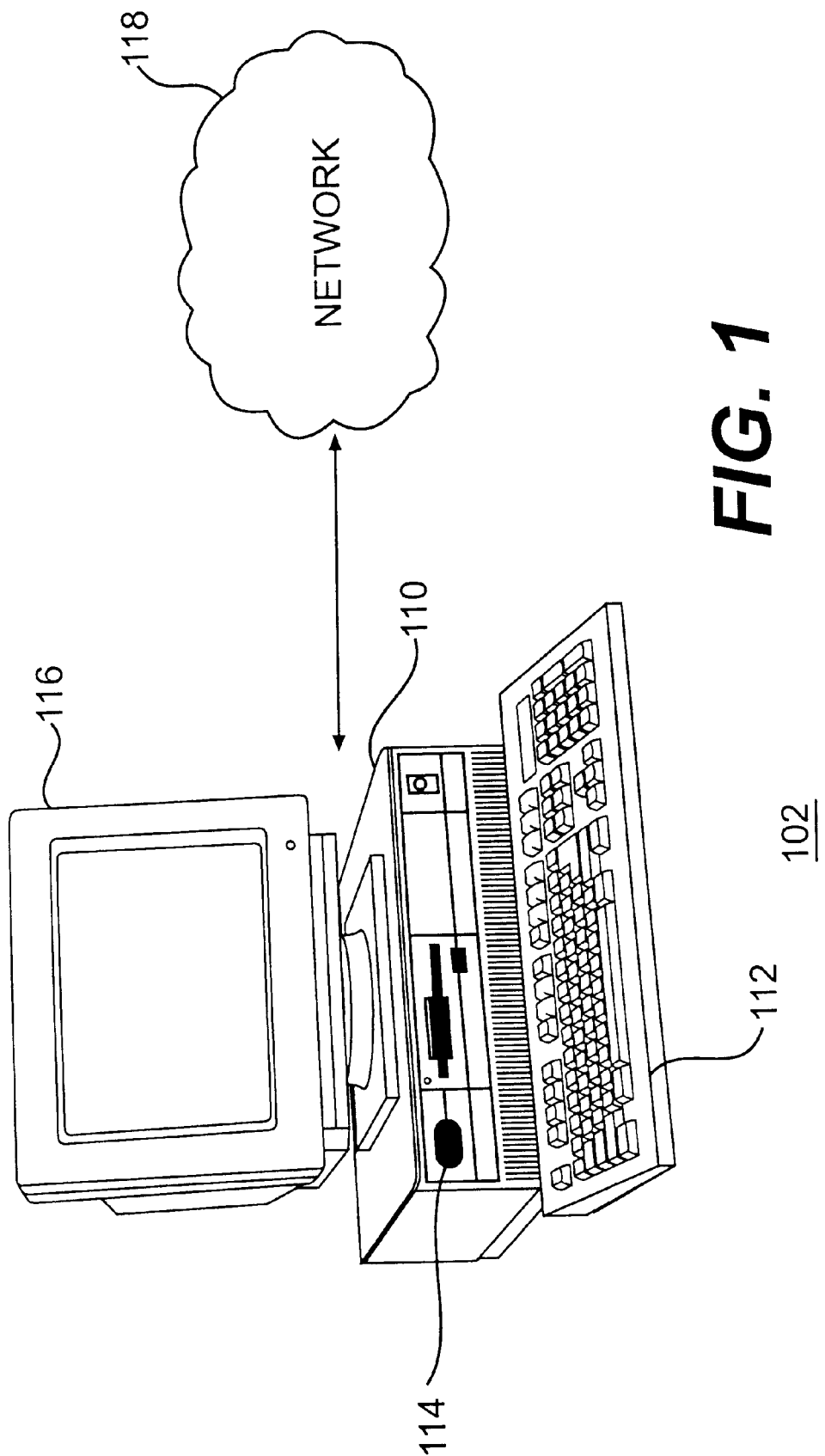
FIG. 1 is a block diagram of an exemplary computer system used to execute a transcription tool consistent with the present invention.

FIG. 1 is a block diagram of an exemplary computer system used to execute a transcription tool. Computer system 102 includes a chassis 110, which holds the computer's main processor and main memory; an input device 112 such as keyboard; a storage device such as floppy or hard disk drive 114; and a display such as monitor 116. Preferably, the methods described herein are executed by the processing section of computer system 102. Computer system 102 is shown connected to network 118, and may be operated directly by a user or through the network.

Many variations of computer system 102 are possible. For example, storage device 114 may additionally include storage media such as optical disks, and user input device 112, may include any type of user input device such as: an electronic mouse, a trackball, a lightpen, a touch-sensitive pad, a digitizing tablet, or a joystick. Additionally, the processor within chassis 110 may be an embedded processor within a circuit board of a larger processing system.

Figure 2:
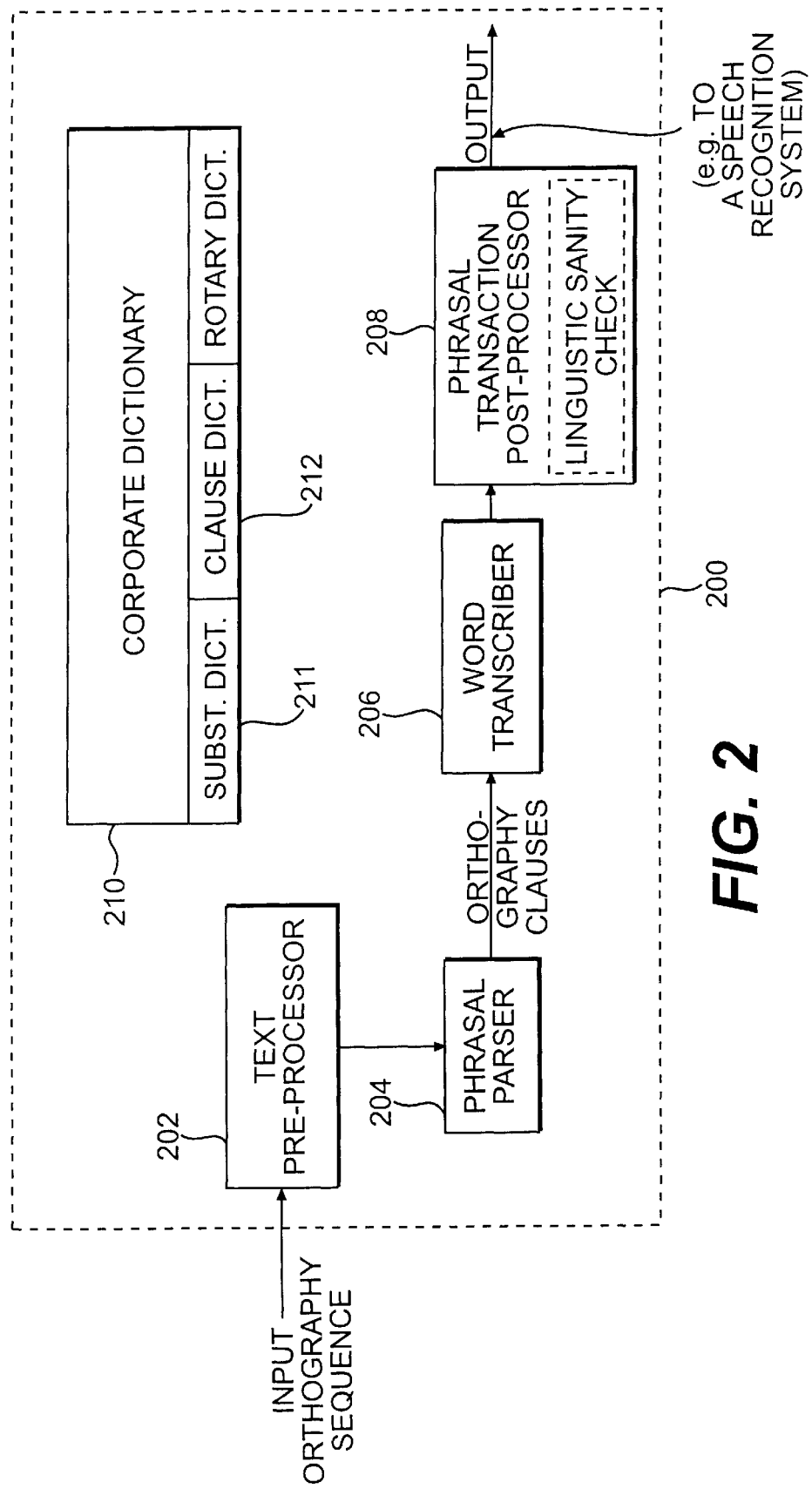
FIG. 2 is high level block diagram illustrating the functional relationships of the various components of a transcription tool consistent with the present invention.

FIG. 2 is high level block diagram illustrating the functional relationships of the various components of transcription tool 200. The sequence of orthographies that make up the to-be-transcribed dictionary are input to text preprocessor 202. Phrasal parser 204, the word transcriber 206, and phrasal transcription post-processor 208 then sequentially receive and process the data. Text pre-processor 202 performs initial substitution processing on the input orthography sequences, phrasal parser 204 groups related adjacent input orthographies into clauses, word transcriber 206 performs phonetic transcription, and phrasal transcription post-processor 208 performs post-transcription functions such as liason handling and sanity checking. Components 202, 204, 206, and 208 use data from corporate dictionary 210, which is primarily a lookup table of orthographies and their known corresponding transcriptions, including any optional information.

Components 202, 204, 206, and 208 are each described in more detail below.

Text Pre-Processor

Text pre-processor 202 transforms input orthographies into a more suitable form. For example, it may compare the input orthographies to a stored substitution dictionary and substitute known alternate spellings for certain orthographies to spellings more conducive to transcription. More specifically, pre-processor 202 expands abbreviations and substitutes typical spellings of certain novelty words or proper names. Alternate functions of text pre- processor 202 include diacritic placement and latinization of non-latin letters (for example, the Icelandic d, may be mapped to "th").

Text pre-processor 202 compares each input phrase to a substitution dictionary 211, which is a subset of corporate dictionary 210, and substitutes matches with alternate phrases specified in dictionary 211. Substitution dictionary 211 is preferably generated by the designer to handle abbreviations, novelty words, or proper names. Example dictionary entry pairs include: {ave., avenue}, {inc., incorporated}, {Toys R Us, toys are us}, {Friendz, friends}. Similarly, proper name pairs may also be included in dictionary 210 to force transcription tool 200 to pronounce a known phrase with an unusual pronunciation. For example, a place named "chili," pronounced "chy-lee" instead of the usually pronunciation of chili as in "chili con carne," may be paired with an alternate spelling, such as "shy lee."

Phrasal Parser

Phrasal parser 204 uses clause dictionary 212 to group multiple sequential input orthographies into "clauses," where a clause is one or more sequential orthographies. The parsing is performed by looking ahead a certain number of words, and marking a series of orthographies as a clause if it is in the clause dictionary. Otherwise, phrasal parser 204 indicates that the single orthography is itself a clause. For example, assuming the phrase "tae kwon do" is in clause dictionary 212, then the series of orthographies "tae kwon do center" would be parsed into two clauses, "tae kwon do" and "center." Additionally, parser 204 may attach syntactic or semantic tags to the output clauses. These tags may be used by word transcriber 206 to refine the orthography transcription.

Word Transcriber

Figure 3:
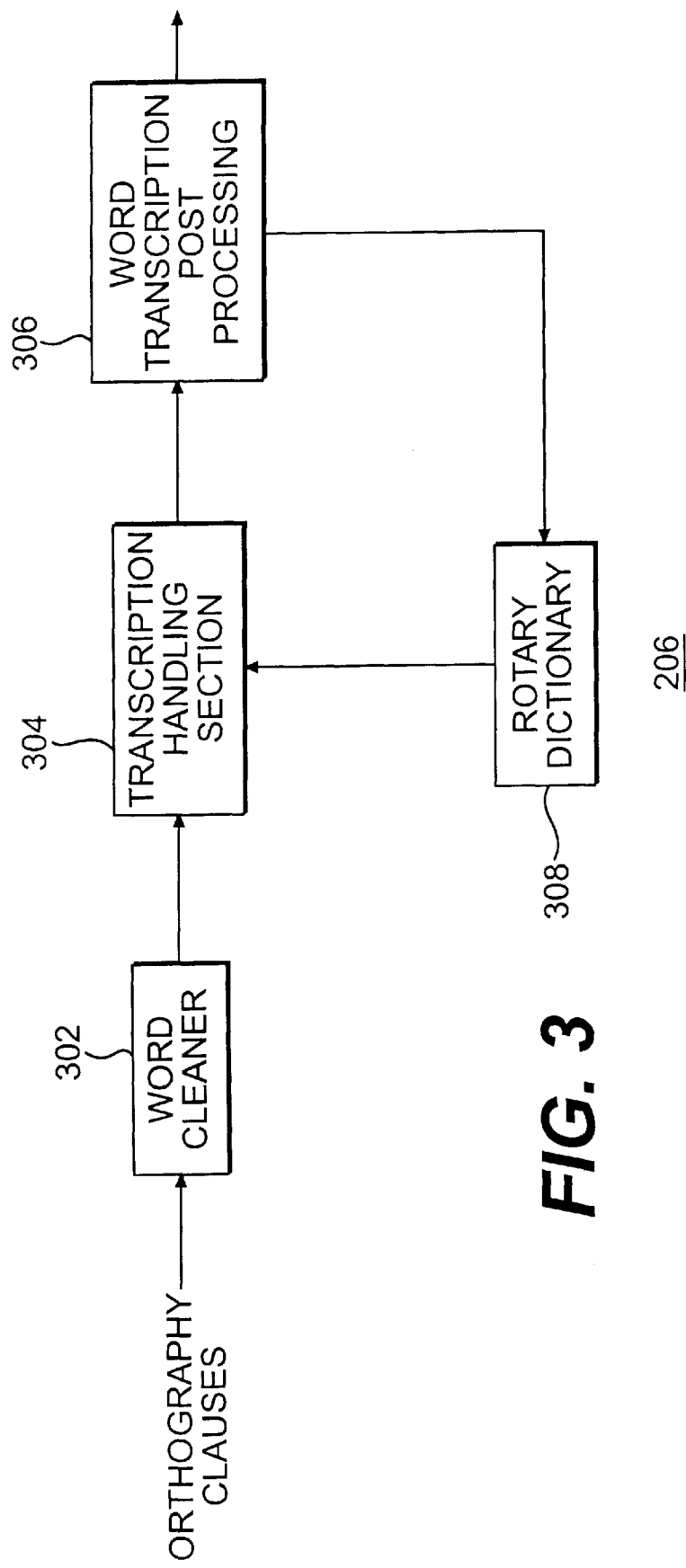
FIG. 3 is a block diagram illustrating components of a word transcriber consistent with the present invention.

Word transcriber 206 receives orthography clauses from phrasal parser 204 and outputs one or several syllabified and stress assigned phonemic transcription hypotheses. FIG. 3 is a block diagram illustrating components of word transcriber 206 in more detail. Specifically, word transcriber 206 includes word cleaner 302, transcription handling section 304, word transcription post processing section 306, and corporate dictionary 308.

Word cleaner 302 removes extraneous punctuation from the orthography, and, optionally, normalizes the orthography with respect to case and accent. Normalizing text with respect to case refers to changing the case of the orthography to that expected by transcription handler 304. Similarly, normalization with respect to accent refers to removing accents not supported by transcription handler 304. For example, after cleaning the orthography "What?" becomes "what" and "André" becomes "Andre".

Transcription handling section 304 receives cleaned words from word cleaner 302 and performs the actual phonemic transcriptions. An output phonemic transcription may include multiple transcription hypotheses. Depending on the method used to transcribe the input words, the phonetic transcription may or may not include stress and syllabification information. For the output transcriptions that do not contain stress or syllabification information, this information is added by word transcription post processing section 306.

Rotary dictionary 308, an instance of corporate dictionary 210, is an on-line dictionary of orthographies and transcriptions, that may be dynamically updated by word transcription post processing section 306. Because some words in a task recur, the rotary dictionary is able to increase transcription throughput. This is especially important for words transcribed using relatively slow letter-to-phoneme handlers.

Figure 8:
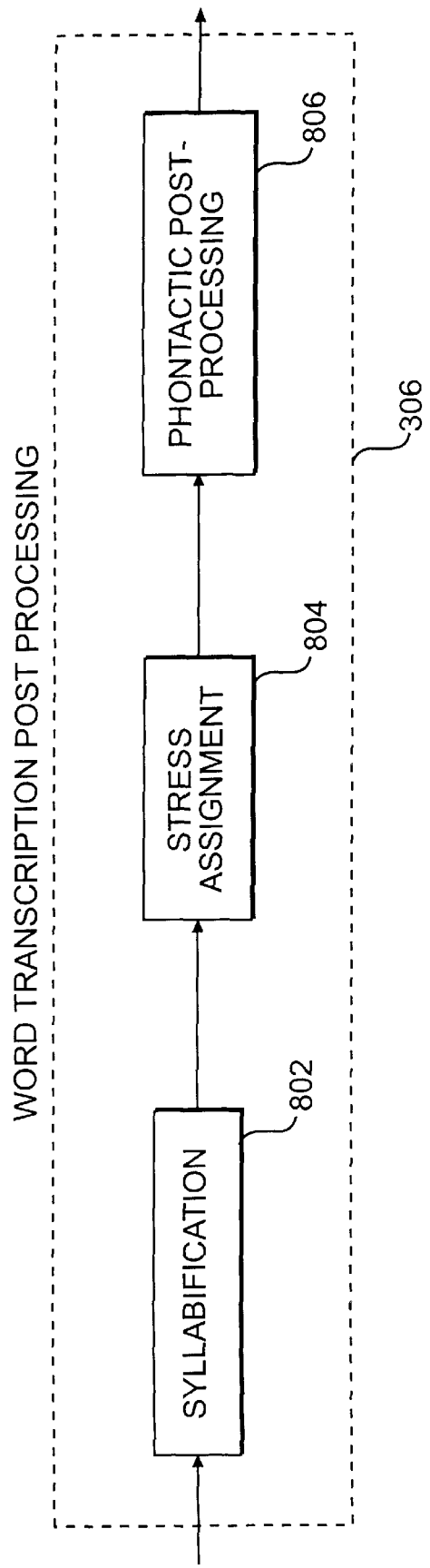
FIG. 8 is a block diagram illustrating the main functions of a word transcription post processing section consistent with the present invention.

Transcription handling section 304 and word transcription post processing section 306 are explained in more detail below, with reference to FIGS. 4–7 (for transcription handling section 304) and FIGS. 8–10 (for word transcription post processing section 306).

Figure 4:
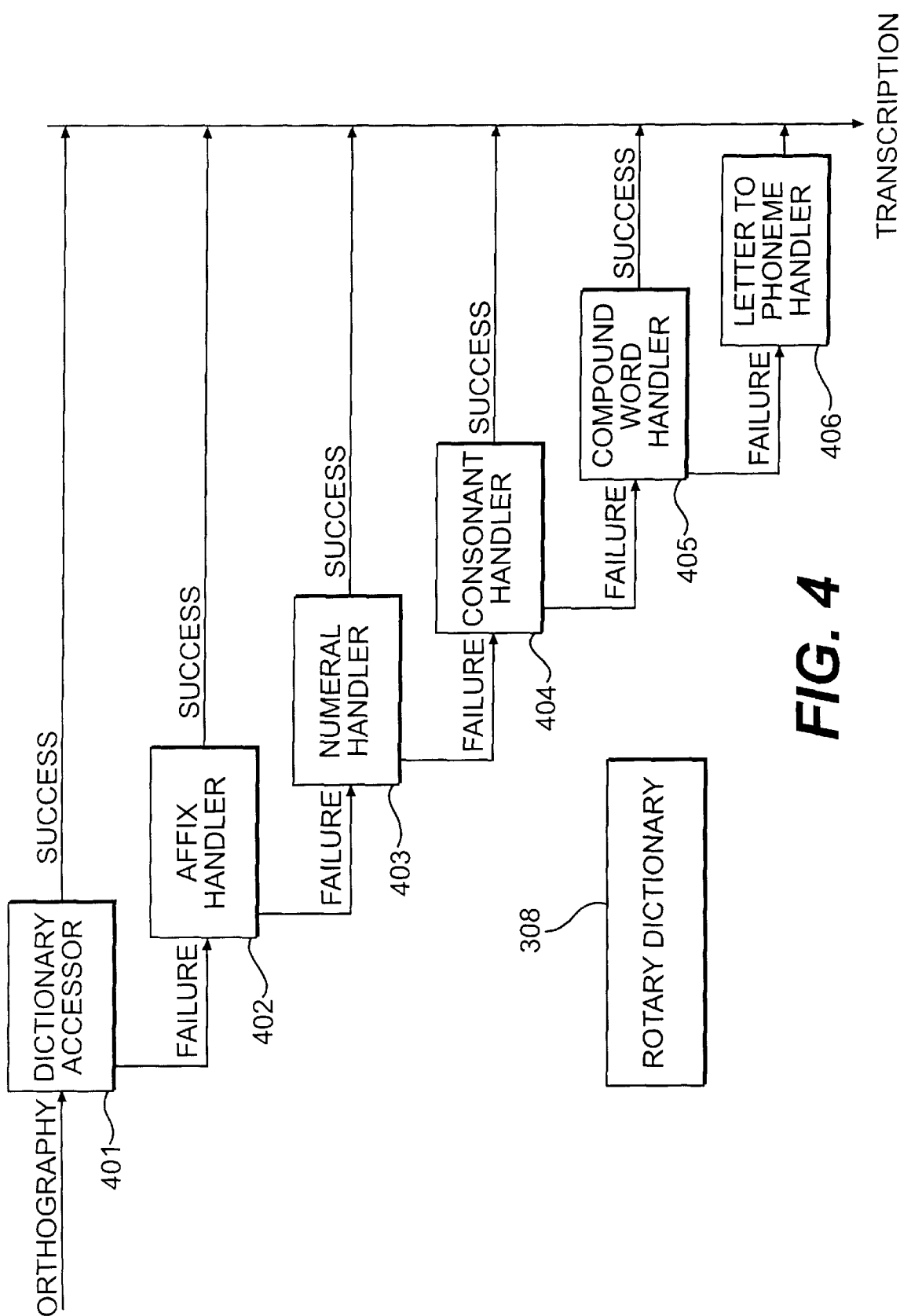
FIG. 4 is a diagram illustrating an exemplary organization of software routines included in a transcription handling section consistent with the present invention.

FIG. 4 is a diagram illustrating an exemplary organization of the software routines included in transcription handling section 304. As shown, a plurality of handlers 401 through 406 are arranged in cascade such that if a handler fails to generate a successful transcription hypothesis, the next handler in the chain is executed.

Dictionary access handler 401 first attempts to transcribe the input orthography clause, and if it succeeds, the phonemic transcription is output. If it fails, affix handler 402 attempts to transcribe the input orthography clause. Similarly, if handler 402 fails, numeral handler 403 attempts to perform the transcription. This process is repeated through consonant handler 404 and compound word handler 405. If handlers 401 through 405 fail, the handler of last resort, letter to phoneme handler 406, is executed.

Phonemic transcriptions that were previously transcribed are stored in rotary dictionary 308. Dictionary access handler 401 searches rotary dictionary 308 using the input orthography clause as a key. If a match is found, the matching phonemic transcription, including any related stress, syllabification information, or part of speech tags, is output. In addition to the transcription, stress, and syllabification information, other aspects of a transcription could be stored in rotary dictionary 308, such as, for example, definitions, semantic information, and etymologies relating to the orthographic clause. Still further, some orthographies can be stored having multiple transcriptions and part-of-speech tags. Table I, below, lists some exemplary transcriptions.

TABLE I

| Orthography | Part-of-speech | Transcription(s) |
|---|---|---|
| object | verb | [*b-dZEkt][0-1] |
| object | noun | [Ab-dZ*kt][1-0] |
| Tae Know Do | noun | [taj#kwAn#do][1-1-1] |
| ATM | acronym | [e#ti#EM][1-1-1] |
| Schedule | verb, noun | [skE=dzul][1-0] |
|  |  | [SE=dZul][1-0] |

Affix handler 402 transcribes input orthographies by identifying a root word within the orthography, and then using an "affix rule knowledge base" to extend the basic transcription of the root word to the complete transcription. The affix rule knowledge base includes three sets of transcription rules generated by a linguistic expert. The first set of transcription rules is an orthographic affix transformation rule base that specifies how root orthographies may be modified to generate their affixal forms. For example, given the root word "admit," the orthographic affix transformation rule base may specify that this word can be affixed by deleting the final "t" and appending the sequence "ission," thereby forming the word "admission." Other orthographic transformation rules include final consonant doubling and final silent "e" deleting.

The second set of transcription rules, called a transcription affix transformation rule base, specifies how root transcriptions are modified when the affixal form of the word is formed. For example, the transformation of "admit" (/admit/) to "admission" is obtained by deleting the /t/ and adding /=S*n/ to obtain /ad-mi=S*n/. Finally, the third set of transcription rules, called the part-of-speech transformation rule base, specifies how the part of speech of the root word changes when modified to its affixal form. For example, the verb "admit," when modified to "admission," becomes a noun.

In operation, orthographies received by affix handler 402 are decomposed using the orthographic affix transformation rule base into a sequence consisting of the orthographies' prefixes, root word, and suffixes. The root word is then transcribed using a dictionary lookup scheme similar to that implemented by dictionary accessor 401. The transcription for the whole orthography, including its part of speech, is then obtained by modifying the transcription of the root word according to the transcription affix transformation rule base and the part-of-speech transformation rule base.

Note the above described transcription rule bases take into account the fact that portions of certain affixes are contextually influenced, such as the suffix '+s' which can be realized as /s/, /z/, or /*z/, and the suffix '+ed', which can be realized as /t/ or /*d/. Additionally, although the examples given above used only a single affix, affix handler 402 can accept multiple affixes. For example, "decommissioning" can be decomposed into "de"+"commission"+"ing".

As well as transcribing unknown orthographies, affix handler 402 can be used to add new transcriptions to corporate dictionary 210. For example, a root word with its corresponding part of speech and transcription may be specified by an expert. The affix knowledge is then applied to the root word to generate all the affixal variants. These variants are double checked by the expert, and, if acceptable, added to corporate dictionary 210. When used in this manner, affix handler 402 can significantly increase the transcription rate of an expert.

Numeral handler 403 is designed to handle phonemic transcriptions of symbolic numbers such as Arabic numbers. Numeral handler 403 first uses a rule-based algorithm to expand the Arabic representation of the number into an alphabetic sequence. Special care is taken to handle numerals with affixes, such as "100th," "2nd," and "3ieme," in which case the root number is transcribed, and the appropriate numeral affix is applied. Several alphabetic hypotheses, yielding several phonemic transcriptions, may be permitted for each number. Table II lists exemplary Arabic numbers and their orthographic representations.

TABLE II

| Test Arabic Number | Interpretation |
| --- | --- |
| 101 | one-hundred-and-one |
|  | one-oh-one |
|  | a-hundred-and-one |
|  | one-zero-one |
| 4289 | forty-two-eighty-nine |
|  | four-thousand-two-hundred-and-eighty-nine |
|  | four-two-eight-nine |
| 23rd | twenty-third |

Once converted to an appropriate orthography, the numbers are transcribed using a dictionary lookup scheme similar to that implemented by dictionary accessor 401.

Consonant handler 404 transcribes orthographies consisting solely of consonants. In most languages, orthographies that consist of only consonants are not permitted. Consonant handler 404 interprets such orthographies as being pronounced one letter at a time. The interpretation is accomplished by inserting white space between adjacent consonants in the sequence, and then separately transcribing the individual consonants using a dictionary lookup. Table III lists exemplary outputs of consonant handler 404.

TABLE III

| Orthography | Interpretation | Transcription |
| --- | --- | --- |
| BNR | B N R | [bi#En#AR][1-1-1] |
| DTW | D T W | [di#ti#dˆ=b*1-ju][1-1-1-0-3] |

Compound word handler 405 transcribes orthographies by comparing substrings of the input orthographies to the corporate dictionary. If compound word handler 405 is able to resolve the input orthography into its constituent parts, and all the constituent parts are in the corporate dictionary, then the final transcription is taken as a concatenation of the constituent transcriptions from the corporate dictionary. Preferably, compound word handler 305 breaks input orthographies into constituent left and right substrings. A valid substring must have at least one vowel and three characters. For example, "bluebird" would be broken into "blue" and "bird".

If the corporate dictionary contains stress information for the constituent transcriptions, then compound word handler 405 must also resolve stress inconsistencies introduced by the concatenation. This may be accomplished by modifying the stress field of the output transcription so that there is only a single primary stress. Preferably, the leftmost primary stress is retained and the primary rightmost stress is demoted to secondary stress.

Table IV lists example orthographies with their corresponding constituent parts and transcriptions. For orthographies having more than one possible transcription, the most balanced one is given the highest priority (shown first in the table), where balance refers to the centrality of the decomposition, so that a word split near the middle is assigned a higher precedence that a word split closer to an end.

TABLE IV

| Orthography | Decomposition | Transcription(s) |
| --- | --- | --- |
| ambassador-ships | ambassador + ship | [am-ba=s*=d*r#SIps][0-1-0-0-2] |
|  |  | [am-ba=s*=dOr#SIps][0-1-0-2-2] |
| anyplace | any + place | [E=ni#ples][1-2-2] |
| allshouse | all + shouse | [Ol#Saws][1-2] |
|  |  | [Ol#Sawz][1-2] |
|  | alls + house | [Olz#haws][1-2] |
| alterman | alter + man | [Ol-t*r#man][1-0-2] |
|  | al + terman | [al#t*r-m*n][1-2-0] |
|  | alt + erman | [Olt#*r-m*n][1-2-0] |

If handlers 401 through 405 are unable to generate an appropriate transcription, the transcription is generated by letter-to-phoneme handler 406. One of two different letter-to-phoneme algorithms is used: a rule-based algorithm or a data-driven algorithm. Preferably, languages with consistent spelling to pronunciation correspondences, such as German, Spanish, and Italian, use rule-based letter-to-phoneme algorithms. Languages with irregular spelling to pronunciation correspondences, such as English and French, use data-driven letter-to-phoneme algorithms.

The rule-based letter-to-phoneme algorithm uses grapheme (i.e., orthographic letter sequences) to phoneme mappings provided by a linguistic expert. Knowledge bases from which the expert derives appropriate rules, such as standard dictionaries, are widely known. Each mapping is determined by a nucleus grapheme sequence and its surrounding context. The nucleus is the grapheme sequence that is transformed to the target phoneme sequence. The context is the environment in which the transformation occurs. In case of conflicting contexts, the longest context is applied first. When multiple, equally long contexts exist, the leftmost context is applied.

Table V illustrates several grapheme to phoneme mappings from a Spanish language rule-base.

TABLE V

| Source Grapheme Sequence | Context | Target Phoneme Sequence |
| --- | --- | --- |
| gu | before "e" or "i" | g |
| n | all contexts | G |

TABLE V-continued

| Source Grapheme Sequence | Context | Target Phoneme Sequence |
|---|---|---|
| g | before "e" or "I" | K |
| g | between vowels | G~ |
| g | {r,l}_{vowel} | G~ |
| g | {all other contexts} | g |

As mentioned previously, data-driven algorithms may alternatively be used in place of rule-based algorithms. In the data-driven algorithm consistent with the present invention, grapheme-to-phoneme mappings are extracted from a training dictionary and assigned a mapping value between 0.0 and 1.0, inclusive, which roughly indicates the likelihood of the particular mapping occurring. The derived grapheme-to-phoneme mapping values are stored in the corporate dictionary.

Figure 5:
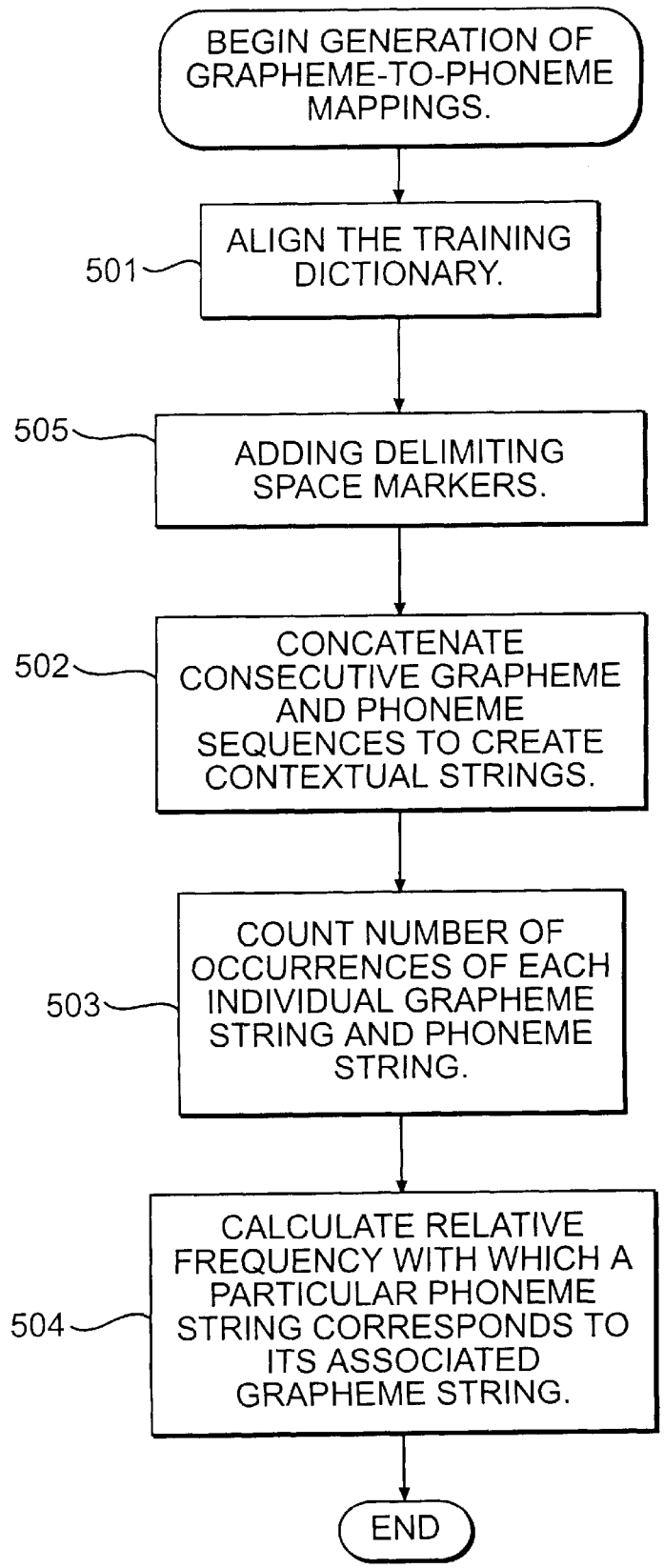
FIG. 5 is a flow chart illustrating methods consistent with the present invention for generating grapheme-to-phoneme mapping values from a training dictionary.

FIG. 5 is a flow chart illustrating methods consistent with the present invention for generating the grapheme-to-phoneme mapping values from a training dictionary. The process is begun by aligning the training dictionary (step 501). In aligning the dictionary, each character or string of characters in each orthography is associated with a corresponding phoneme or string of phonemes in the transcription. For example, the words "melon," "less," and "tax," which have corresponding transcriptions of /mEl*n/, /lEs/, and /taks/, respectively, are aligned in Table VI.

TABLE VI

| Grapheme | Phoneme | Grapheme | Phoneme | Grapheme | Phoneme |
|---|---|---|---|---|---|
| l | l | m | m | t | t |
| e | E | e | E | a | a |
| ss | s | l | l | x | ks |
|  |  | o | * |  |  |
|  |  | n | n |  |  |

With the training dictionary aligned, consecutive grapheme and phoneme sequences are concatenated to create contextual strings (step 502). For example, the first two grapheme-to-phoneme mappings from "melon" can be merged into a new mapping, as in the association "me" and /mE/. Table VII, below, lists the possible contextual strings for "melon." To create stronger correspondences at word edges, delimiting spaces (step 505) are used in the concatenations shown in the table.

Table VII

| Grapheme | Phoneme | Grapheme | Phoneme | Grapheme | Phoneme |
|---|---|---|---|---|---|
| me | mE | elo | El* | _melon | #mEl*n# |
| el | El | elon | El*n | _melon_ | #mEl*n# |
| lo | l* | lon | l*n | n_ | n# |
| on | *n | _m | #m | on_ | *n# |
| mel | mEl | _me | #mE | lon_ | l*n# |
| melo | mEl* | _mel | #mEl | elon_ | El*n# |
| melon | mEl*n | _melo | #mEl* | melon_ | mEl*n# |

The number of grapheme strings and phoneme strings are accumulated, (step 503), and the system then determines grapheme-to-phoneme mapping values for each mapping as the relative frequency with which the particular phoneme string occurs with its associated grapheme string. That is, for each mapping pair, the grapheme-to-phoneme mapping value is the number of occurrences of the particular phoneme string divided by the total number of occurrences of the grapheme string. For example, if the grapheme-to-phoneme pair {me, /me/} was observed once, and the pair {me, /m*/} was observed three times, the grapheme-to-pheneme mapping values would be 0.25 for the first pair and 0.75 for the second.

Exemplary grapheme-to-phoneme mapping values are given in the following table. In practical applications, the corporate dictionary may contain 350,000 or more grapheme-to-phoneme mappings.

TABLE VIII

| Grapheme | Phoneme | Grapheme-to-phoneme mapping value. |
|---|---|---|
| oo | /U/ | 0.47 |
|  | /u/ | 0.46 |
|  | /^/ | 0.01 |
| ouch | /^tS/ | 0.33 |
|  | /uS/ | 0.24 |
|  | /awtS/ | 0.33 |
|  | /utS/ | 0.06 |
| tion | /S*n/ | 0.98 |
|  | /tS*n/ | 0.02 |

Figure 6:
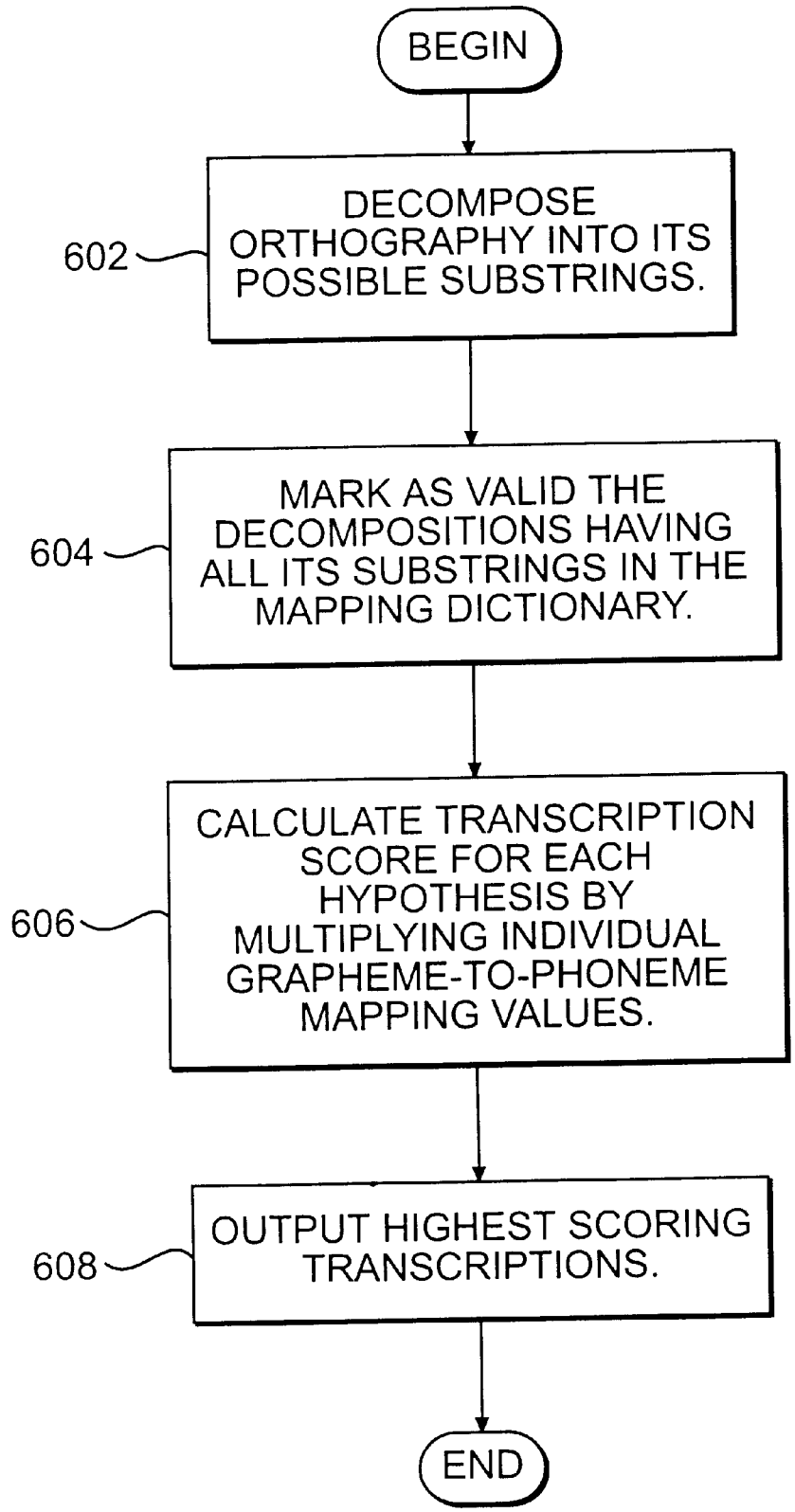
FIG. 6 is a flow chart illustrating methods consistent with the present invention for generating a phonemic transcription using grapheme-to-phoneme mappings in a corporate dictionary.
Figure 7:
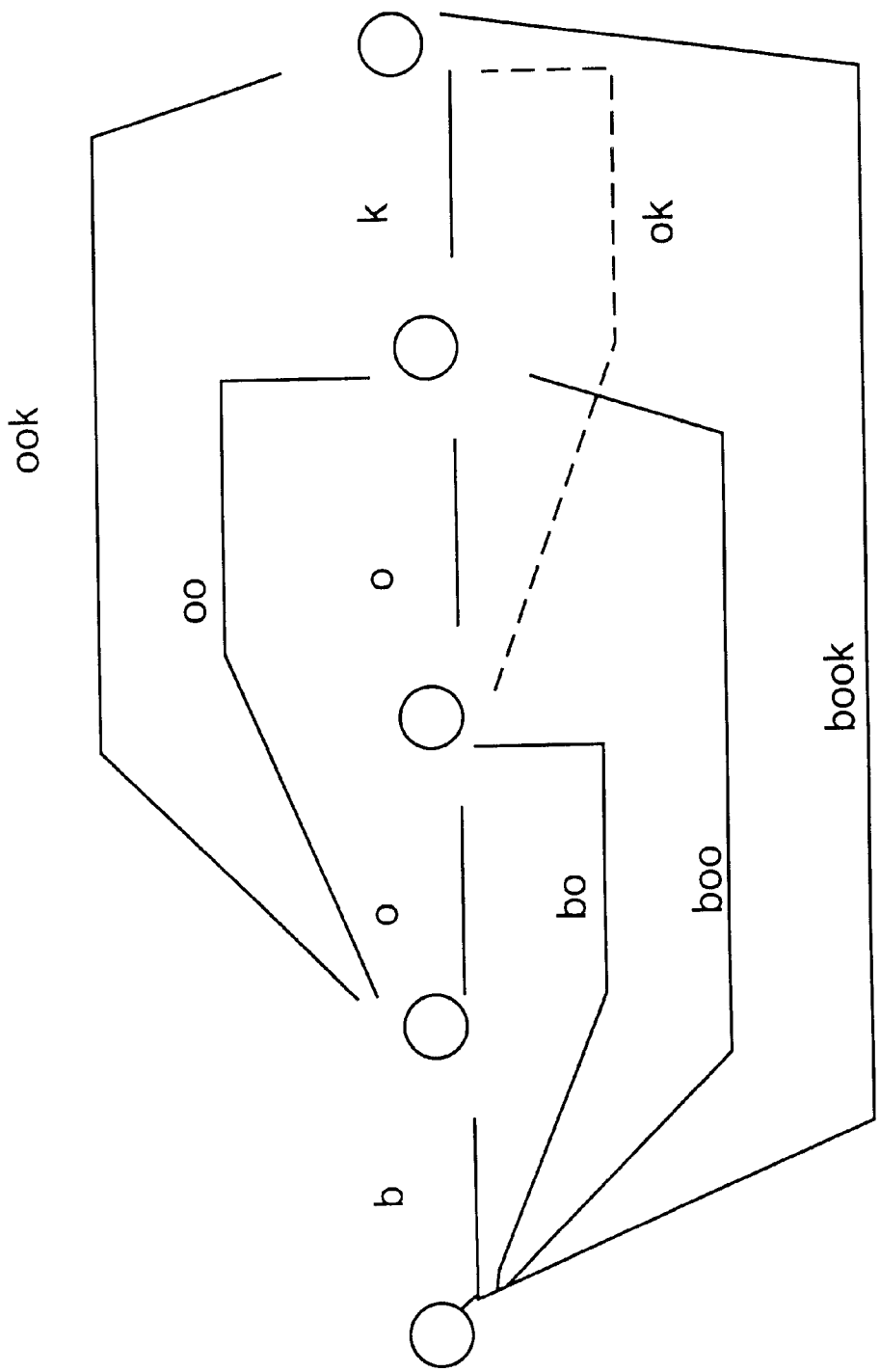
FIG. 7 is a graph of possible substring decompositions for the word "book"

FIG. 6 is a flow chart illustrating steps for generating a phonemic transcription using grapheme-to-phoneme mappings in the corporate dictionary. For each input orthography, such as, for example, "book," handler 406 decomposes the orthography into its possible component substrings (step 602). Possible substring decompositions for "book" are shown graphically in FIG. 7, and include: {b, o, o, k}, {b, oo, k}, {b, o, ok}, {b, ook}, {book}, {bo, o, k}, {bo, ok}, {boo, k}. Decompositions made up entirely of graphemes present in the corporate dictionary are then marked as valid (step 604). For each valid decomposition, a transcription score is generated by multiplying the grapheme-to-phoneme likelihood values in the corporate dictionary (step 606). The highest transcription scores are output as the transcription hypotheses (step 608).

As an example of the above-described process, assume the following grapheme to phoneme mappings are valid: {b, /b/, 1.0}, {o, /o/, 0.7}, {o, /*/, 0.3}, {k, /k/, 1.0}, {oo, /U/, 0.6}, {oo, /u/, 0.4}, {bo, /bo/, 0.4}, {bo, /bA/, 0.3}, {bo, /b*/, 0.3}, {ok, /ok/, 0.8}, and {ok, /Ak/, 0.2}. Using these mappings, the largest transcription hypotheses for book comes from the decomposition {b, oo, k}, corresponding to the phonemic transcription /bUk/ and having a value of 0.6 (1.0*0.6*1.0). As the phonemic transcription with the highest score, it is the most probable phonemic transcription and is therefore output. Other transcription hypotheses generated from this example include /buk/ 0.4, /boAk/ 0.08, /bo*k/ 0.21, /b*ok/ 0.24, and /b*Ak/ 0.06. Some or all of these transcription hypotheses may also be output as secondary hypotheses.

Transcription hypotheses generated in transcription handler section 304 are next processed by word transcription post-precessing section 306. FIG. 8 is a block diagram illustrating the main functions of word transcription post processing section 306. As shown, section 306 includes components for syllabification 802, stress assignment 804, and phonotactic post-processing section 806.

Syllabification is the process of automatically providing syllable boundaries to a phoneme sequence. Preferably, a syllabification process consistent with methods of the present invention is performed using a data-driven algorithm, although a rule-based algorithm may also be used. Stress assignment is the process of labeling a transcription with a primary stress marker. The data-driven stress assignment algorithm described below is preferably used. As with syllabification, rule-based stress assignment algorithms are known, and may in some cases be used. Both syllabification and stress assignment are only applied to transcriptions that were not assigned syllabification and stress information within transcription handling section 304.

Data-driven syllabification or stress assignment algorithms learn syllabification or stress assignment rules for a language by examining training data, i.e., data known to be correct. The training set is a set of known syllabified or stress assigned transcriptions from the corporate dictionary. In general, the syllabification method consistent with the present invention examines inter-vowel consonant sequences, and compares these sequences with those available in the training set. If an inter-vowel consonant sequence fails to appear in the training set, a fall back algorithm based on maximum onset is invoked.

Syllables relate to the rhythm of a language, and, as used in this disclosure, are defined as a collection of phonemes with the following structure:

[onset] nucleus [coda], where the brackets around "onset" and "coda" indicate that these components are optional. The "onset" and "coda" are a sequence of one or more consonants, and the nucleus is a vowel or diphthong.

In some languages, including English, a consonant may be both the coda of one syllable and the onset of the next syllable. In such a case, the boundary between the syllables is labeled as "ambisyllabic", and is assigned the symbol "=". Otherwise, the syllable boundary is assigned the symbol "–". For example, the word "northern" (/nOr-D*rn/) parses into syllables /nOr/ and /D*rn/, with a discrete junction between /r/ and /D/. The parsing of the word "city" (/sI=ti/) is not discrete, since the /t/ phoneme belongs to both syllables. Syllables may have onset, nucleus, and coda (e.g., /stlk/, /lIg~/); onset and nucleus, but no coda (e.g., /li/, /gaw/); nucleus, coda, but no onset (e.g., /iz/); or even a nucleus, but no onset or coda (e.g., /aj/).

Methods consistent with the present invention for performing data-driven syllabification will now be described in detail with reference to FIGS. 9 and 10.

Syllabification section 802 inserts syllables into input transcriptions using information present in a syllabification table populated by analyzing a training dictionary. Tables IX–XI, below, illustrate an exemplary, albeit small, population from a training dictionary.

TABLE IX

| Sequence (S2'$_n$) | Syllabification (S1'$_n$) |
|---|---|
| Arm* | Ar-m* |
| es* | e=S* |
| i* | i-* |
| Eri | E=ri |
| *b* | *=b* |
| io | i-o |
| Ent* | En-t |
| Adri | A-dri |
| *kstra | *k-stra |

TABLE X

| Sequence (S1$_n$) | Syllabification (S2$_n$) |
|---|---|
| r | =r |
| nt | n-t |
| nd | n-d |
| st | =st |
| mb | m-b |
| kn | k-n |
| tw | t-w |
| pj | =pj |
| bl | =bl |

TABLE XI

| Onset Sequence | Syllabification |
|---|---|
| skj | -skj |
| skr | -skr |
| fj | -fj |
| fr | -fr |
| kj | -kj |
| kr | -kr |
| mj | -mj |
| m | -m |
| j | -j |
| r | -r |

Figure 9:
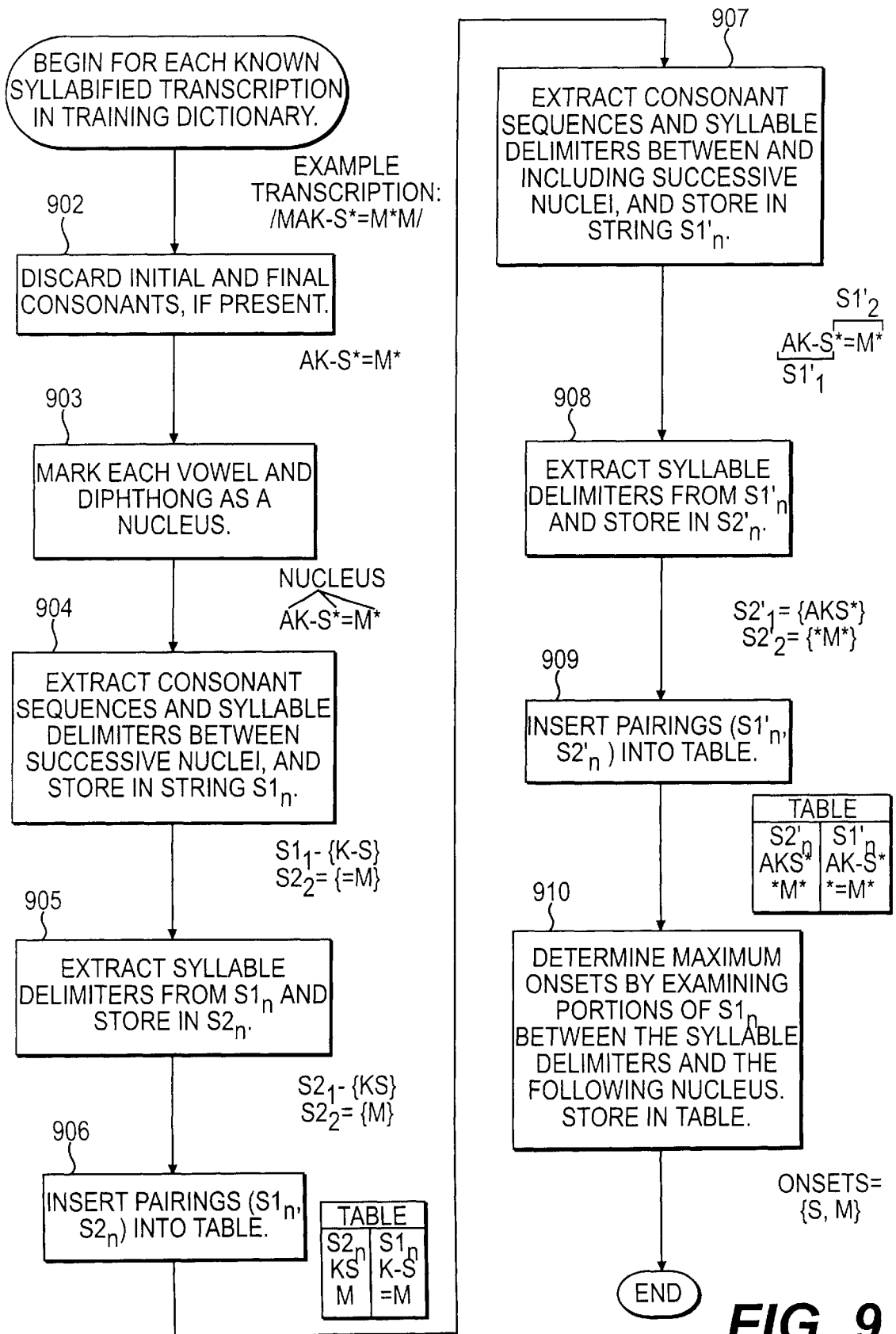
FIG. 9 is a flow chart illustrating steps for populating a syllabification table consistent with the present invention.

FIG. 9 is a flow chart illustrating steps for populating a syllabification table, such as Tables IX–XI. The text to the right of the steps shown in FIG. 9 illustrate an example of each step applied to the syllabified phonemic transcription /mak-s*=m*m/, which corresponds to the orthography "maximum".

For each entry in the training dictionary, syllabification section 802 discards any initial and final consonants (step 902), so that the resulting transcription fragment begins and ends with a vowel. Each vowel and dipthong in the transcription fragment is then marked as a nucleus (step 903). Consonant sequences, including their syllable delimiters, between nuclei are then extracted and stored in a first string, S1$_n$ (step 904). In the example shown in FIG. 9, the two consonant sequences present are stored in strings S1$_1$ and S1$_2$. Corresponding consonant sequences, minus the syllable delimiters, are stored in a second string, S2$_n$ (step 905). The string pairs (S2$_n$, S1$_n$) define mappings from non-syllabified internucleus consonants to syllabified internucleus consonants. Additional exemplary mappings are shown in Table IX.

Steps 907–909 are similar to steps 904–906, except steps 907–909 extract consonant sequences along with their delimiting nuclei. Specifically, syllabification section 802 extracts consonant sequences and syllable delimiters between and including successive nuclei, and stores the sequences in string S1'$_n$ (step 907). The syllable delimiters from S1'$_n$ are then extracted and the result stored in S2'$_n$ (steps 908 and 909). The string pairs (S2'$_n$, S1'$_n$) define mappings from non-syllabified internucleus consonants, including delimiting nuclei, to corresponding syllabified internucleus consonants. Exemplary mappings are shown in Table X.

Finally, syllabification section 802 determines maximum onsets by examining portions of S1$_n$ between the syllable delimiters and the following nucleus (step 910). The allowed maximum onsets are stored. Additional exemplary maximum onsets are shown in Table XI.

Tables similar to Tables IX–XI, but extrapolated to the whole training data set, are preferably generated by syllabification section 802 and stored. During active transcription syllabification, syllabification section 802 uses the stored tables to perform syllabification. FIG. 10 is a flow chart illustrating methods consistent with the present invention for performing the syllabification.

For each input transcription to be syllabified, syllabification section 802 begins by assigning initial consonants to the onset of the first syllable (step 1001). Similarly, final consonants are assigned to the coda of the final symbol (step 1002). Vowels and diphthongs are then detected and labeled as nuclei (step 1003). For each consonant sequence in the transcription, if the consonant sequence, appended with delimiting vowels, is present in the appropriate syllabification table, syllable markers are placed according to the table entry (steps 1004 and 1005). If the consonant sequence appended with data values is not present, the consonant sequence without its delimiting vowels is checked (step 1007). If it is a known sequence, syllable markers are placed in the same position as the known sequence (step 1006). Otherwise, the maximum legal onset before the next nucleus is looked up, and the syllable marker is placed before the maximum legal onset (step 1008).

Figure 10:
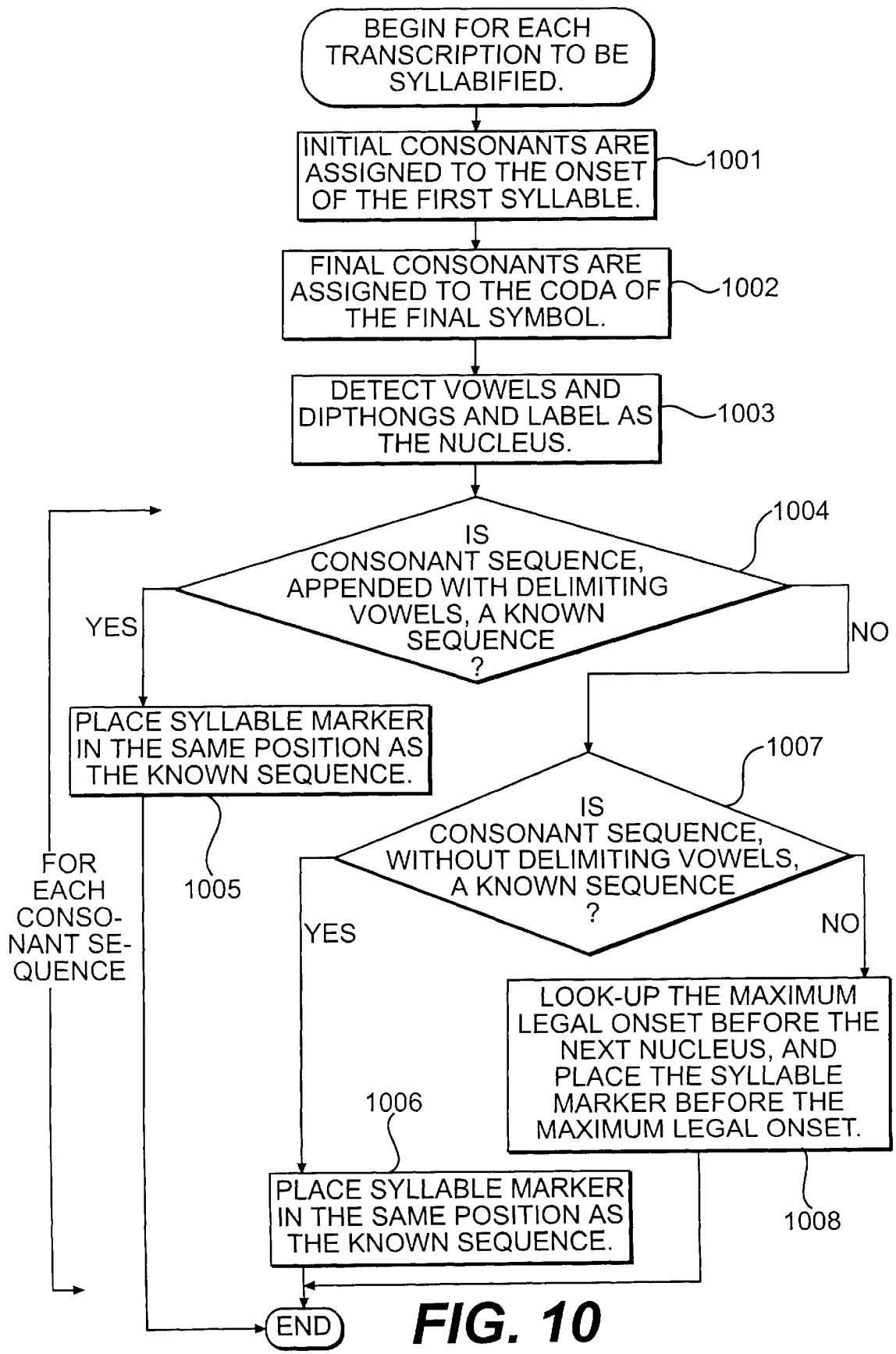
FIG. 10 is a flow chart illustrating methods consistent with the present invention for performing syllabification.

To further illustrate the method shown in FIG. 10, consider the following transcriptions with unknown syllabification:

worthy—/w*rDi/

Celeste—/s*lEst/ formulate—/fOrmjulet/

The first example has two vowels, /*/ and /i/, which are nuclei. Assuming the internucleus sequence with delimiters, "*rDi", is not in the training set, but the internucleus sequence "rD" is in the training set, and has correspondence /r-D/, the syllabification is then set to /w*r-Di/.

The second example has two vowels, /*/ and /E/. Assume the sequence /*lE/ is in the training set, and has correspondence /*-lE/. The syllabification is /s*-lEst/.

The third example has three vowels, /O/, /u/, and /e/. Assume the first internucleus sequence with vowel delimiters, /Ormju/, is not in the training set, and the internucleus sequence without delimiters, /rmj/, is also not in the training set. The longest candidate for onset, /rmj/, is not valid, although the next longest candidate onset /mj/ is valid, hence, place the syllable boundary at /r-mj/. Assume the second internucleus sequence with delimiters, /ule/, is in the training set and has correspondence /u-le/. The syllabification is then /fOr-mju-let/.

After syllabification, the transcriptions are assigned stress. As used throughout this disclosure, a value of "1" is assigned to a syllable if it takes primary stress, "2" if it takes secondary stress, and "0" if it is unstressed. For example, in the transcription /k*-mju=n*-ke=S*nz/ [0-2-0-1-0] ("communications"), the fourth syllable has primary stress, the second syllable has secondary stress, and the first, third, and fifth syllables are unstressed.

In a manner similar to syllabification section 802, stress assignment section 804 assigns stress information based on lookup tables pre-generated from a training dictionary. Two lookup tables are used, a primary and a secondary lookup table.

Methods consistent with the present invention for performing data-driven stress assignment will now be described in detail with reference to FIGS. 11–12.

Figure 11:
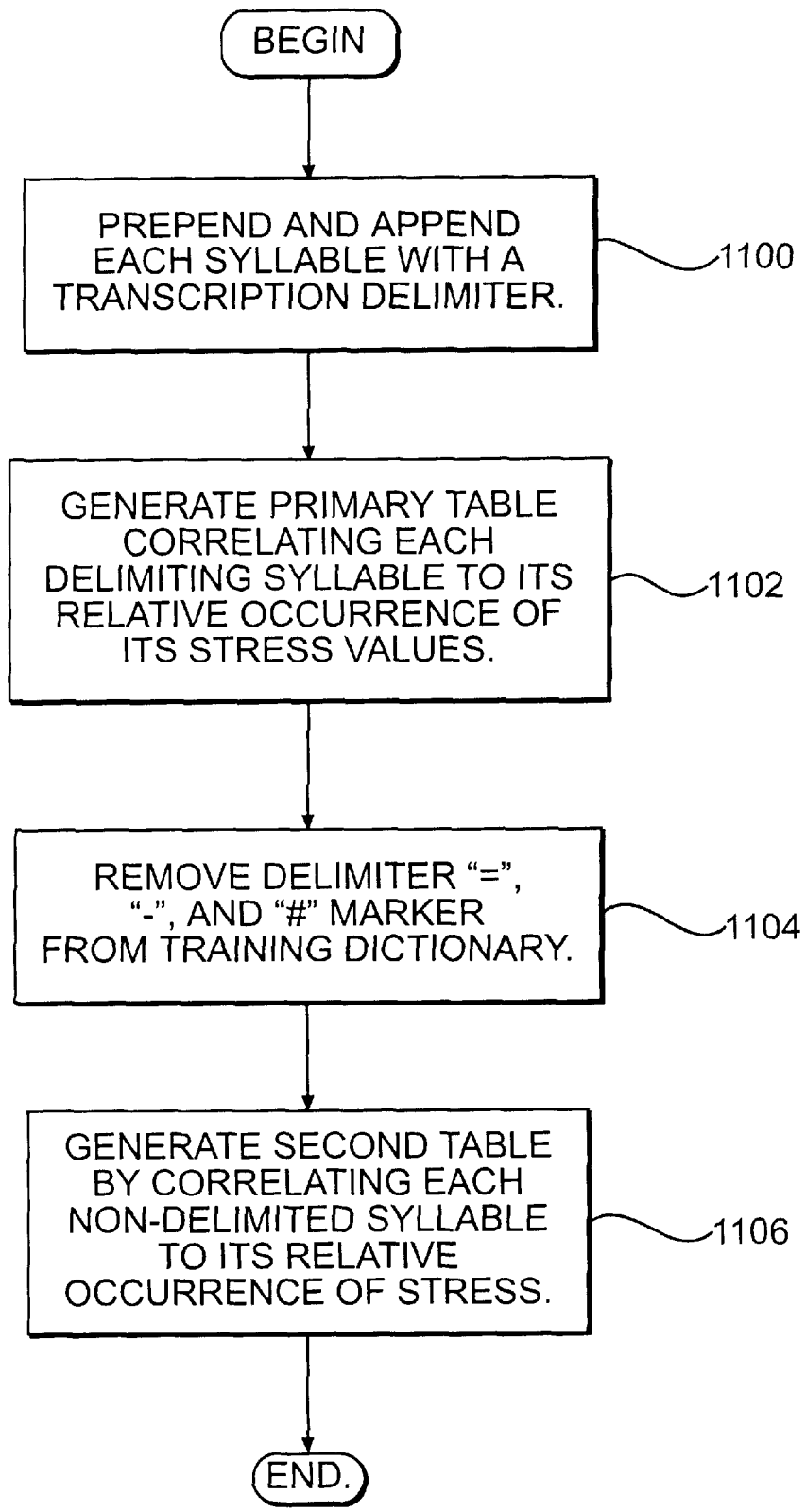
FIG. 11 is a flow chart illustrating steps for populating primary and secondary lookup tables used in assigning stress information.

FIG. 11 is a flow chart illustrating steps for populating the primary and secondary lookup tables. Stress assignment section 804 first prepends and appends each transcription in the training dictionary with the "#" symbol (step 1100). The "#" symbol is used to denote a terminus of a transcription, so that when the transcription is eventually split, the terminus of the transcription can still be recognized. Based on the prepended and appended training dictionary, stress assignment section 804 generates the primary table correlating each delimited syllable to its relative occurrence of stress (step 1102). That is, for each syllable, the number of primary, secondary, and unstressed occurrences are summed, and the resultant three numbers are normalized.

To generate the secondary tables, the transcription delimiter ("#") and the syllabification delimiters are removed ("=" and "-") (step 1104). The training dictionary is then reanalyzed by stress assignment section 804, which generates the secondary table by correlating each non-delimited syllable to its relative occurrence of stress (step 1106).

Table XII, below, illustrates exemplary entries in the primary and secondary tables.

TABLE XII

| Syllable | Primary Stress | Secondary Stress | Unstressed |
|---|---|---|---|
| Primary Table | | | |
| #pArt# | 1 | 0 | 0 |
| #pArt- | .88 | .12 | 0 |
| -pArt# | .5 | .5 | 0 |
| -pArt- | 1 | 0 | 0 |
| #hA- | .37 | 0 | .63 |
| #ha= | .92 | .08 | 0 |
| -hA= | .92 | .08 | 0 |
| =hA# | 0 | 0 | 1 |
| Secondary Table | | | |
| pArt | .86 | .14 | 0 |
| hA | .83 | .09 | .08 |

Tables similar to Table XII, but extrapolated to the whole data set, are preferably generated by stress assignment section 804 and stored. During active stress assignment, stress assignment section 804 uses the stored tables to assign stress. FIG. 12 is a flow chart illustrating methods consistent with the present invention for assigning stress.

For each transcription to be assigned stress, stress assignment section 804 prepends and appends the transcription delimiter symbol "#" (step 1202). The syllables of the transcription, including delimiters, are then matched to the primary lookup table (step 1204). If a delimited syllable is found in the primary lookup table, its primary stress value is read from the table and stored (step 1206). If the syllable is not found in the primary lookup table, the syllable delimiters are removed, and the non-delimited syllable is compared to the secondary lookup table (step 1210). If present, its primary stress value is read from the secondary lookup table and stored (step 1212). Otherwise, the syllable is defined a default value such as "0.1." Steps 1204, 1206, 1208, 1210, 1212, and 1214 are repeated for all the syllables in the transcription and the syllable with the highest value is assigned primary stress (step 1216).

Figure 12:
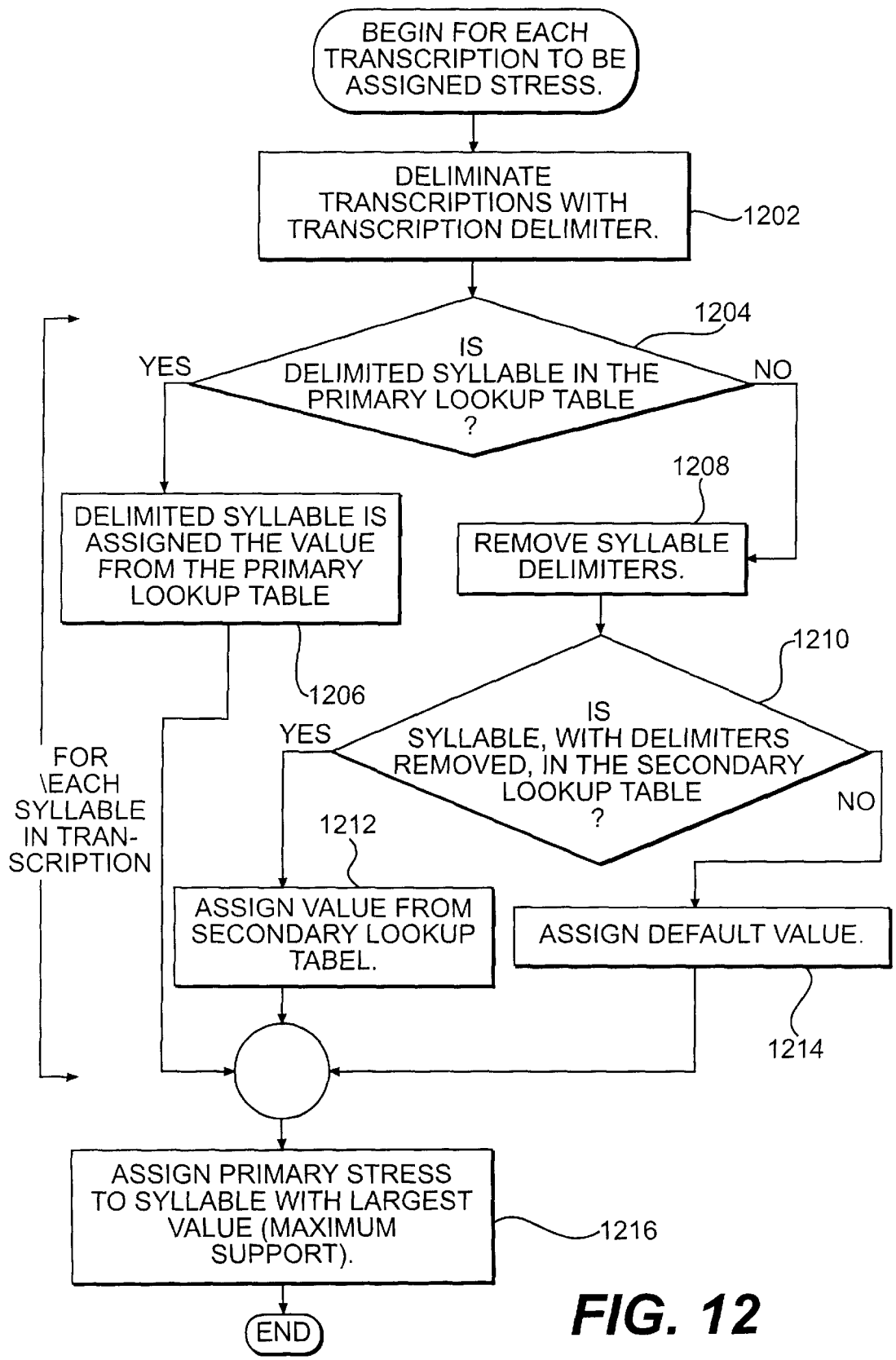
FIG. 12 is a flow chart illustrating methods consistent with the present invention for assigning stress to a transcription.

As an example of the method illustrated in FIG. 12, consider the orthography "rational," which has a transcription of /raS*nal/. After syllabification and after the transcripiton delimiters have been inserted, the transcription is /#ra=S*-nal#/. Assume the syllables /=S*-/ and /-nal#/ are in the primary lookup table and have primary stress values of "0.0" and "1.0" respectively. Further, assume the sequence /#ra=/ is not in the primary lookup table but is in the secondary table and has a value of "0.72". Because /-nal#/ is the syllable with maximum support, primary stress is assigned to this syllable.

Although the described stress assignment algorithm has been discussed in terms of primary stress, the assignment algorithm could be modified to assign secondary stress values from the tables, and to therefore find secondary stress. Other possible modifications to the methods of stress assignment section 804 are possible. For example, the algorithm could incorporate multi-syllable groups into the lookup table or an a priori weighting system could be used to encourage certain stress patterns.

The syllabified, stress assigned transcriptions are next processed by phonotactic post-processing section 806. Phonotactic validation is the process of verifying the generated transcriptions. Preferably, for English transcriptions, the following phonotactics are checked: lax-tense vowel combinations, invalid consonant sequences, implausible vowel beginning or endings, implausible consonant beginnings or endings, double phonemes, and single syllable transcriptions whose only vowel is a schwa. These phonotactic checking algorithms, as well as other possible ones, are rule-based, and are all within the capabilities of one of ordinary skill in the art. If phonotactic irregularities are detected, the transcription is labeled as being phonotactically illegal and is aborted.

TABLE XIII

| Condition | Examples |
| --- | --- |
| Lax-tense Vowel Combination | E-i, a-o |
| Invalid Consonant Sequence | kn, hf |
| Doubling Phonemes (degemination) | k-k, a-a |
| Mono-syllables With Schwa | S*d, tw*n |
| Implausible Vowel Beginning | transcription for "island" can only begin with phonemes /i/, /l/ or /aj/ |
| Implausible Vowel Endings | transcription for "landi" can only end with phonemes /i/ or /aj/ |
| Implausible Consonant Beginning | transcription for "brian" can only being with the phoneme /b/ |
| Implausible Consonant Ending | transcription for "flic" can only end with phoneme /k/ |

Phrasal Transcription Post-Processor 208

Post processor 208 performs final transcription validation functions on transcribed words from word transcriber 206. A number of different functions may be performed by post processor 208, including: (1) concatenation of word transcriptions, (2) liasion handling, (3) transcription limiting, (4) convention checking; and (5) sanity checking.

Transcriptions may be concatenated into phrasal transcriptions in a straightforward string concatenation. A special word separator symbol "#" is used to mark word boundaries in the phrasal phoneme sequence.

Liaison handling is required in certain languages, such as French, where the final phoneme in a word transcription is realized only if the first phoneme of the following words is a vowel or diphthong. The symbol "%" is used to indicate possible liaison. For example, if the phoneme proceeding the transcription /Il-z%/ ("ils") is a vowel, as in /on/ ("ont"), the phoneme /z/ is realized, and post processor 208 ensures the transcription of the phrase "ils ont" is /Il-zon/. However, if the proceeding phoneme is a consonant, as in /dOrm/ ("dormant"), then post processor 208 drops the phoneme /s/, and the phrase "ils dormant" is transcribed as /Il-dOrm/.

Post-processor 208 may also limit the number of allowed phonemic transcription hypotheses pursuant to a user command. Typically, this option is used in real-time transcription scenarios to speed-up speech processing.

Post-processor 208 also performs convention checking by enforcing certain policies relating to phoneme groupings. The following is an exemplary list of enforceable policies:

Stress applied to the vowels /*/ and /I/ should be of a stress level zero in certain contexts.

Vowels before /r/ should be /ir/, /ur/, /Or/, /*r/, and not /Ir/, /Ur/, /or/, /^r/.

Affricates /dZ/, /tS/ should generally replace syllable initial /dz/ or /ts/.

Diphthongs /Oj/, laj/, and /aw/ should replace sequences /oj/, /Aj/, /Aw/.

Disallow double phonemes in most situations (degemination rule).

The syllabification sequences V=CV (vowel=consonant vowel), V=CCV, V–V, and V–CCV requires that the second vowel be unstressed.

Before entry in the corporate dictionary, further validation can optionally be performed using a sanity checker. "Sanity checking" is primarily used to provide feedback to expert transcribers regarding the quality of the corporate dictionaries. Exemplary aspects of transcriptions that may be checked include:

Punctuation in the orthography (highlight possible orthography error).

Part-of-speech (check membership in part-of-speech inventory).

Consistency in white space and transcription word markers (with few exceptions, the word marker "#" is placed between different word transcriptions in a phrase).

Parsable transcription (i.e., phonemes and stress are in inventories)

Consistency in number of syllables, number of vowels, and number of stress values.

Appropriately specified partial transcription bracketing.

It will be apparent to those skilled in the art that various modifications and variations can be made in the above described transcription tool without departing from the scope or spirit of the invention. Other embodiments of the invention will be apparent to those skilled in the art from consideration of the specification and practice of the system and methods disclosed herein. The specification and examples should be considered as exemplary only, with a true scope and spirit of the invention being indicated by the following claims.

What is claimed is:

1. A method of transforming orthographies of words into corresponding phonemic transcriptions, the method comprising the steps of:

receiving an orthography;

generating transcription hypotheses for the received orthography using a selected one of a sequence of handlers, the selected handler being the first in the sequence of handlers that is able to generate a transcription hypothesis, and next sequential ones of the handlers being executed when a previous sequential handler is unable to generate the transcription hypotheses, wherein said step of generating further comprises the substep of assigning spaces between successive consonants in the received orthography and individually transcribing the successive consonants to generate the transcription hypotheses; and outputting the generated transcription hypotheses when said selected handler successfully generates the transcription hypotheses.

2. The method of claim 1, wherein the generating step further includes the substep of having a software handler look up the received orthography in a dictionary.

3. The method of claim 1, wherein the generating step further includes the substeps of extracting a root word from the received orthography, looking up a phonemic transcription of the root word in a dictionary, and generating the transcription hypotheses based on the transcription of the root word.

4. The method of claim 1, wherein the generating step further includes the substeps of transforming an Arabic numeral representation of the received orthography into an orthographic representation and transcribing the orthographic representation to form the transcription hypothesis.

5. The method of claim 1, wherein the generating step further includes the substep of breaking the received orthography into constituent sections, transcribing the constituent sections, and concatenating the transcribed sections to form the transcription hypotheses.

6. The method of claim 1, wherein the generating step further includes the substep of generating the transcription hypotheses by decomposing the received orthography into component graphemes, assigning each said component grapheme a weight, and multiplying the weights of each said component grapheme.

7. The method of claim 1, further including the step of assigning syllable markers to the generated transcription hypotheses.

8. The method of claim 1, further including the step of assigning stress markers to the generated transcription hypotheses.

9. The method of claim 1, further including the step of substituting the received orthographies for alternate orthographies more suitable for transcription.

10. The method of claim 1, further including the steps of:

receiving the output transcription hypotheses;

examining the output transcriptions to ensure that predetermined phonetic policies are followed; and rejecting transcription hypotheses that do not follow the predetermined phonetic policies.

11. The method of claim 1, further including the steps of:

receiving the output transcription hypotheses for a plurality of orthographies; and providing feedback to a linguistic expert on the quality of the transcriptions for the plurality of orthographies by applying a sanity checking algorithm to the output transcription hypotheses.

12. The method of claim 1, further including the step of using the phonemic transcriptions in a speech recognition system.

13. A method of automatically partitioning a transcription into syllables, the method comprising the steps, executed by a data processor, of:

locating consonant sequences in the transcription;

matching the located consonant sequences to a table of known syllabified sequences; and assigning syllable markers to the consonant sequences based on the results of the matching step.

14. The method of claim 13, further including the step of labeling vowels and diphthongs in the transcription as nuclei.

15. The method of claim 14, wherein the step of locating consonant sequences in the transcription further includes the step of locating the consonant sequences as being between successive nuclei.

16. The method of claim 13, wherein the step of matching the consonant sequences includes the substep of:

appending adjacent vowels to the consonant sequence before matching the consonant sequences to a generated table.

17. The method of claim 13, further including the step of assigning initial consonants to a first syllable of the transcription.

18. The method of claim 17, wherein the step of assigning initial consonants to the first syllable includes the substep of assigning the initial consonants to the onset of the first syllable.

19. The method of claim 13, further including the step of assigning final consonants to a final syllable of the transcription.

20. The method of claim 19, wherein the step of assigning final consonants includes the substep of:

assigning initial consonants to the coda of the final syllable.

21. The method of claim 13, further including the step of using the partitioned transcription in a speech recognition system.

22. A computer readable medium storing software that includes instructions for causing a computer to automatically partition a transcription into syllables by performing the steps of:

locating consonant sequences in the transcription;

matching the located consonant sequences to a table of known syllabified sequences; and assigning syllable markers to the consonant sequences based on the results of the matching step.

23. A computer system comprising:

means for receiving a phonemic transcription of a word;

a computer memory storing computer instructions capable of locating consonant sequences in the transcription, matching the located consonant sequences to a table of known syllabified sequences, and assigning syllable markers to the consonant sequences based on the results of the matching; and a processor executing the computer instructions stored in the memory.

* * * * *